(12) United States Patent
Artini

(10) Patent No.: US 7,853,368 B2
(45) Date of Patent: Dec. 14, 2010

(54) METHOD AND DEVICE FOR CONSTRUCTING A LOW ALTITUDE FLIGHT TRAJECTORY INTENDED TO BE FOLLOWED BY AN AIRCRAFT

(75) Inventor: Franck Artini, Toulouse (FR)

(73) Assignee: Airbus France, Toulouse (FR)

( * ) Notice: Subject to any disclaimer, the term of this patent is extended or adjusted under 35 U.S.C. 154(b) by 1032 days.

(21) Appl. No.: 11/129,498

(22) Filed: May 16, 2005

(65) Prior Publication Data
US 2010/0017113 A1    Jan. 21, 2010

(30) Foreign Application Priority Data
May 18, 2004    (FR)    .................................. 04 05381

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| G01C 23/00 | (2006.01) |
| G05D 1/08 | (2006.01) |
| G05D 1/06 | (2006.01) |
| G01C 5/00 | (2006.01) |

(52) U.S. Cl. ........................ 701/3; 701/4; 701/5; 701/8; 701/9

(58) Field of Classification Search ........................ None
See application file for complete search history.

(56) References Cited

U.S. PATENT DOCUMENTS

| | | | |
|---|---|---|---|
| 3,998,412 A | | 12/1976 | Baker et al. |
| 4,467,429 A | * | 8/1984 | Kendig ............................ 701/3 |
| 4,924,401 A | * | 5/1990 | Bice et al. ........................ 701/6 |
| 5,488,563 A | | 1/1996 | Chazelle |
| 5,706,011 A | * | 1/1998 | Huss et al. ...................... 342/65 |
| 5,850,617 A | * | 12/1998 | Libby .......................... 701/202 |

(Continued)

FOREIGN PATENT DOCUMENTS

EP    0565399    10/1993

(Continued)

OTHER PUBLICATIONS

Preliminary Search Report dated Apr. 18, 2005 with English translation.

*Primary Examiner*—Khoi Tran
*Assistant Examiner*—Nicholas Kiswanto
(74) *Attorney, Agent, or Firm*—Dickinson Wright PLLC

(57) ABSTRACT

Method and device for constructing a low altitude flight trajectory intended to be followed by an aircraft.

The device (1) comprises, in particular, a means (6) for constructing a lateral trajectory of the flight trajectory and a means (7) for constructing a vertical trajectory of the flight trajectory, over a profile section defined between two height maxima of a terrain profile, by displacing over the terrain profile a V-shaped construction profile, whose branches are determined respectively by maximum angles of climb and of descent and by selecting a position of the construction profile, for which its edges arrive tangential to the terrain profile, and no peak of the terrain profile crosses the construction profile, the position thus selected of the construction profile allowing the latter to form the part of the vertical trajectory which is situated at the level of said profile section.

15 Claims, 14 Drawing Sheets

U.S. PATENT DOCUMENTS

| | | | |
|---|---|---|---|
| 5,892,462 A * | 4/1999 | Tran | 340/961 |
| 5,922,031 A * | 7/1999 | Larrieu | 701/3 |
| 6,163,744 A * | 12/2000 | Onken et al. | 701/3 |
| 6,269,301 B1 * | 7/2001 | Deker | 701/206 |
| 6,437,707 B1 * | 8/2002 | Johnson | 340/959 |
| 6,480,120 B1 * | 11/2002 | Meunier | 340/970 |
| 6,711,479 B1 * | 3/2004 | Staggs | 701/16 |
| 6,748,325 B1 * | 6/2004 | Fujisaki | 701/301 |
| 2003/0107499 A1 | 6/2003 | Lepere | |

FOREIGN PATENT DOCUMENTS

| | | |
|---|---|---|
| EP | 0775953 | 5/1997 |
| FR | 2813963 | 3/2002 |

* cited by examiner

METHOD AND DEVICE FOR CONSTRUCTING A LOW ALTITUDE FLIGHT TRAJECTORY INTENDED TO BE FOLLOWED BY AN AIRCRAFT

The present invention relates to a method and device for constructing a low altitude flight trajectory intended to be followed by an aircraft.

Within the framework of the present invention, the expression low altitude flight trajectory is understood to mean a flight trajectory allowing an aircraft to follow as closely as possible the terrain overflown, while avoiding any risk of collision with a part of said terrain. Such a flight trajectory is therefore situated at a predetermined height from the terrain, for example 500 feet (around 150 meters).

More particularly, although not exclusively, the present invention applies to a military transport plane which exhibits a low thrust/weight ratio and a high inertia, and whose maneuvering times are relatively slow in particular with respect to those of a lighter and very nimble plane, such as a combat plane for example. Moreover, for such a military transport plane, it is in general desirable for the guidance not to be too abrupt, in particular for the comfort of the passengers, and for said airplane not to be easily detectable.

The subject of the present invention is a method making it possible to construct a low altitude flight trajectory intended to be followed by an aircraft, in particular a military transport plane, said flight trajectory comprising a lateral trajectory and a vertical trajectory and being constructed with the aid of a terrain profile (emanating from a digital database or from a mapping radar) pertaining to a terrain to be overflown by the aircraft.

According to the invention, said method is noteworthy in that said vertical trajectory is formed, over a profile section defined between two height maxima of said terrain profile:
  by displacing over said terrain profile a V-shaped construction profile, whose branches are determined respectively by maximum angles of climb and of descent (provided at that location); and
  by selecting a position of said construction profile, for which its edges arrive tangential to said terrain profile, and no peak of said terrain profile crosses said construction profile, the position thus selected of the construction profile allowing the latter to form the part of the vertical trajectory which is situated at the level of said profile section.

In this case, advantageously:
  the two branches of the V-shaped construction profile join up according to a circular arc transition phase; and/or
  the two height maxima of the terrain profile, making it possible to define a profile section to be taken into account, are separated horizontally by at least a distance corresponding to a minimum length pertaining to a segment of the vertical trajectory; and/or
  in the case where the construction profile cannot be inscribed between said two height maxima, the angle between the two branches of said construction profile is increased until this inscription is made possible.

In a preferred embodiment, the lateral trajectory of the flight trajectory is formed, in a horizontal plane, by a succession of branches which are rectilinear and which are separated from one another by first transition phases (curvilinear).

In this case, advantageously, at least one of said first transition phases, between two successive branches, corresponds to a circular arc of constant radius of curvature (dependent on a maximum allowable load factor).

Advantageously, two successive branches cross at a turning point, said turning point is associated with an overfly condition pertaining to an obligation of the aircraft to overfly or not to overfly this turning point, and the corresponding first transition phase takes account of this overfly condition.

Additionally, in a preferred embodiment, the vertical trajectory of the flight trajectory is formed, in a vertical plane, by a succession of segments which are rectilinear and which exhibit a constant slope.

Advantageously, the slope of each of said segments is determined as a function of said terrain profile and of performance (climb and descent) of the aircraft and lies within a domain of slope values that is limited by a maximum angle of climb and a maximum angle of descent, which are characteristic of this expected performance. Between these two slope values which are the maximum values that the aircraft can attain, the slope is altered as a function of the profile and of constraints such as a minimum distance dmin specified hereinbelow.

Moreover, advantageously, said maximum angles of climb and descent depend on flight conditions which are predicted over the corresponding segment.

Firstly, said maximum angle of climb is preferably determined from the following flight conditions, which are predicted over said segment:
  the maximum continuous thrust of the aircraft with a faulty engine;
  the predicted wind;
  the predicted exterior temperature;
  the mass of the aircraft;
  the maximum altitude of said segment;
  the predicted aerodynamic configuration of the aircraft; and
  the preset speed over said segment.

Secondly, said maximum angle of descent is preferably determined from the following flight conditions, which are predicted over said segment:
  the idling thrust of the aircraft with all its engines operational;
  the predicted wind;
  the predicted exterior temperature;
  the mass of the aircraft;
  the maximum altitude of said segment;
  the predicted aerodynamic configuration of the aircraft; and
  the preset speed over said segment.

Additionally, in a preferred embodiment, each segment exhibits a predetermined minimum length. Thus, the number of break points of the vertical trajectory is reduced, thereby making it possible:
  to reduce the workload of the crew; and
  to improve the comfort of the passengers, in particular on heavy airplanes.

In this case, advantageously, to be able to follow the terrain profile as closely as possible, account is taken of the following characteristics in constructing said vertical trajectory:
  a climb at maximum angle of climb is favored with respect to a descent at maximum angle of descent, in the case where the terrain profile tends to rise between two height maxima; and
  a descent at maximum angle of descent is favored with respect to a climb at maximum angle of climb, in the case where the terrain profile tends to drop between two height maxima.

The present invention also relates to a device for constructing a low altitude flight trajectory intended to be followed by an aircraft, in particular a military transport plane, said flight trajectory comprising a lateral trajectory and a vertical trajectory.

According to the invention, said device of the type comprising:

a means providing a terrain profile pertaining to a terrain to be overflown by the aircraft;

a set of onboard information sources, able to produce information pertaining to the aircraft and to its environment;

a first means for constructing said lateral trajectory of the flight trajectory; and a second means for constructing said vertical trajectory of the flight trajectory, is noteworthy in that said second means constructs said vertical trajectory, over a profile section defined between two height maxima of said terrain profile:

by displacing over said terrain profile a V-shaped construction profile, whose branches are determined respectively by maximum angles of climb and of descent (provided at that location); and by selecting a position of said construction profile, for which its edges arrive tangential to said terrain profile, and no peak of said terrain profile crosses said construction profile, the position thus selected of the construction profile allowing the latter to form the part of the vertical trajectory which is situated at the level of said profile section.

The figures of the appended drawing will elucidate the manner in which the invention may be embodied. In these figures, identical references designate similar elements.

FIGS. 18 to 22 diagrammatically show particular cases during the construction of a vertical trajectory, in a climb phase.

FIGS. 23 to 26 diagrammatically show particular cases during the construction of a vertical trajectory, in a descent phase.

Figure 1:
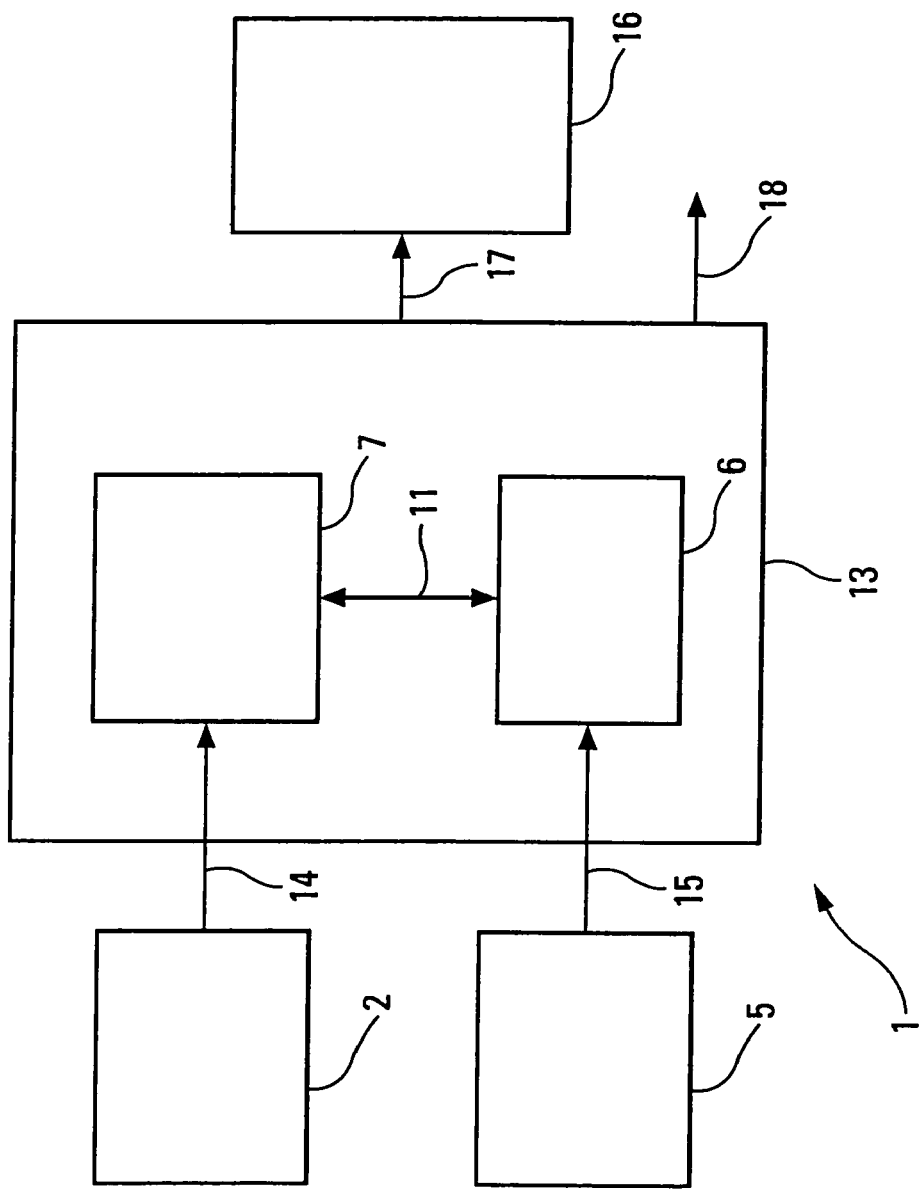
FIG. 1 is the schematic diagram of a device in accordance with the invention.

The device 1 in accordance with the invention and represented diagrammatically in FIG. 1 is devised for the construction of a low altitude flight trajectory TO intended to be followed by an aircraft A, in particular a military transport plane. Said flight trajectory TO comprises a lateral trajectory TL which is defined in a horizontal plane and represented partially in FIG. 2 and a vertical trajectory TV (or flight profile) which is defined in a vertical plane and represented partially in FIG. 5.

Said flight trajectory TO is a low altitude flight trajectory allowing the aircraft A to follow as closely as possible the terrain 3 overflown.

Figure 5:
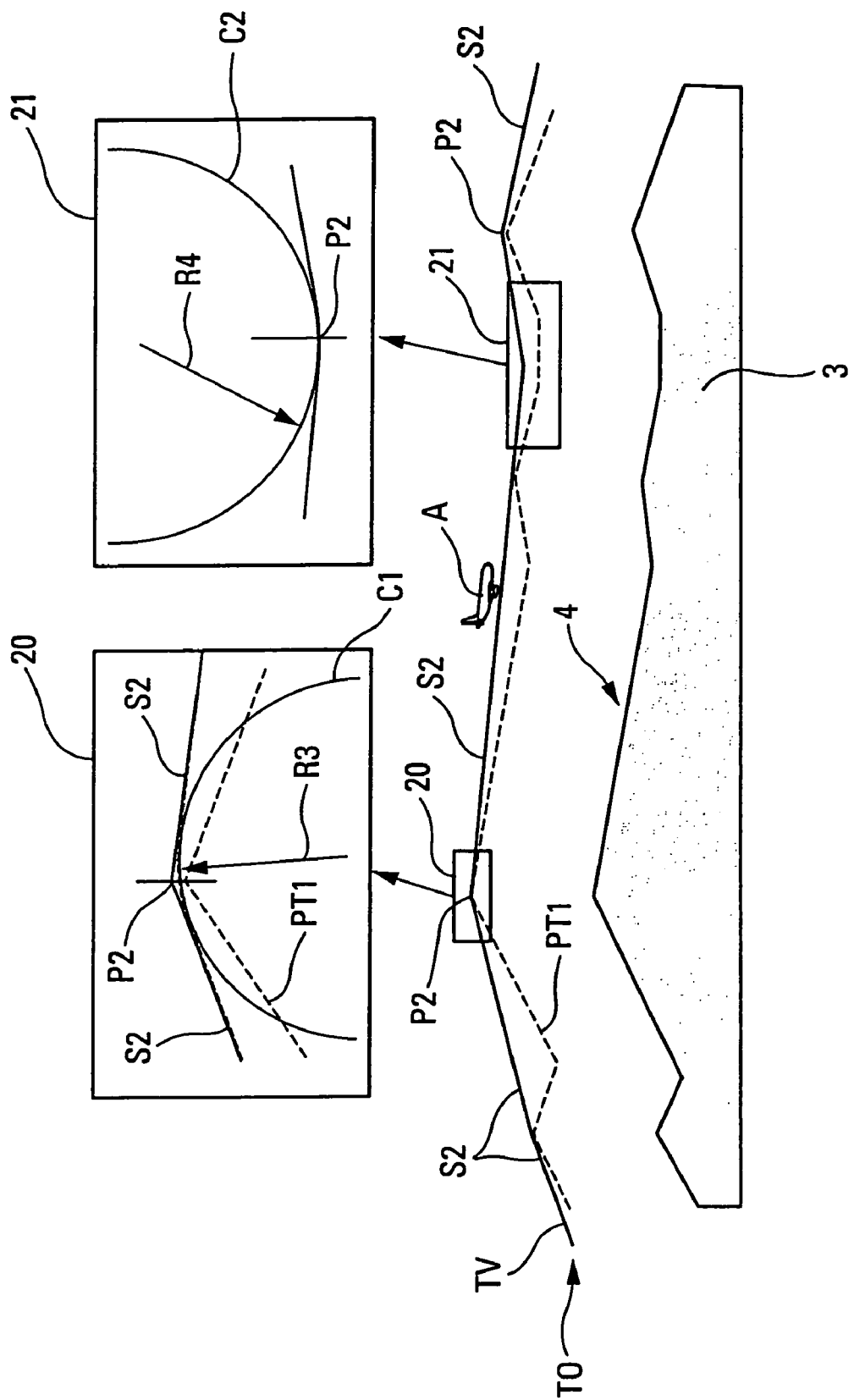
FIGS. 5 to 17 are graphics making it possible to explain the construction of a vertical trajectory.

To do this, said device 1 which is on board the aircraft A is of the type comprising:

a means 2 providing a terrain profile PT1 pertaining to the terrain 3 to be overflown by the aircraft A, whose relief 4 is represented in FIG. 5. In the example of FIG. 5, the terrain profile PT1 is situated at a predetermined guard height above said relief 4. Said means 2 may be a digital database, carried on board and containing the terrain profile PT1, or a device, such as a radar in mapping mode for example, for ascertaining said terrain profile PT1 on board the aircraft A;

a set 5 of onboard information sources, able to produce information (such as the mass, the speed or the maximum descent and climb performance) pertaining to the aircraft A and information pertaining to its environment (wind, temperature, etc.);

a means 6 for constructing said lateral trajectory TL of the flight trajectory TO; and a means 7 for constructing said vertical trajectory TV of the flight trajectory TO.

In a particular embodiment, represented in FIG. 1:

said means 6 is connected by a link 11 to said means 7;

said means 6 and 7 are grouped together into a central unit 13 which is connected by links 14 and 15 to the means 2 and to the set 5 of information sources; and said device 1 moreover comprises a display means 16 which is connected by a link 17 to the central unit 13 and which is able to present a pilot with the results of the processing operations implemented by said central unit 13. This makes it possible in particular for a pilot to visually check whether the result of the calculation of the vertical trajectory TV is not absurd in regard to said terrain profile PT1. These results may also be transmitted to other user devices (not represented), and in particular to a standard guidance system of the aircraft A, by way of a link 18.

Figure 2:
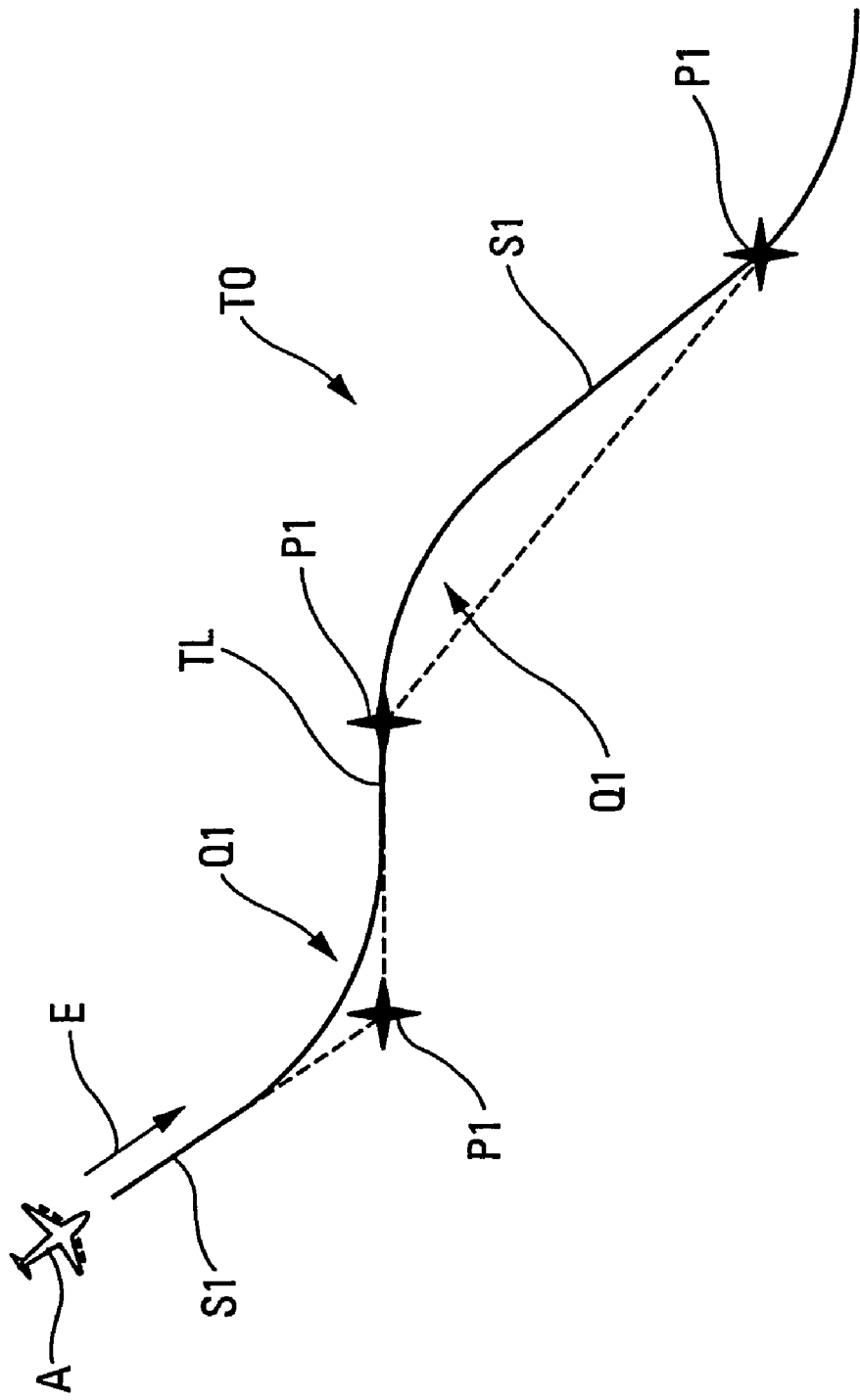
FIGS. 2 to 4 are graphics making it possible to explain the construction of a lateral trajectory.

In a preferred embodiment, said lateral trajectory TL of the flight trajectory TO which is determined by the means 6 is formed, in a horizontal plane, by a succession of branches S1 which are rectilinear and which join up at points P1 referred to as "curvilinear abscissae", as represented in FIG. 2. In order for the aircraft A to be able to fly along said lateral trajectory TL, said branches S1 are separated from one another by transition phases Q1, at said points P1.

Said lateral trajectory TL is determined from a lateral flight plan which comprises:

the sequence of points P1 which are defined by an operator, in particular by the pilot, in longitude and latitude; and for each of these points P1, one of two constraints:

an overfly constraint (or condition) whereby it is obligatory to overfly the corresponding point P1, as represented for the second point P1 of FIG. 2 in the direction of flight E of aircraft A; and an anticipation constraint whereby it is obligatory to anticipate the turn at the point P1 and therefore not to overfly the latter, as represented for the first point P1 of FIG. 2.

By virtue of these constraints, the means 6 can determine the type of transition for the corresponding transition phase Q1, namely:

either a transition with overfly obligation;

or a transition with anticipation of turn.

In case of absence of definition of such constraints, the means 6 can use a default constraint, preferably said constraint with overfly obligation.

Figure 3:
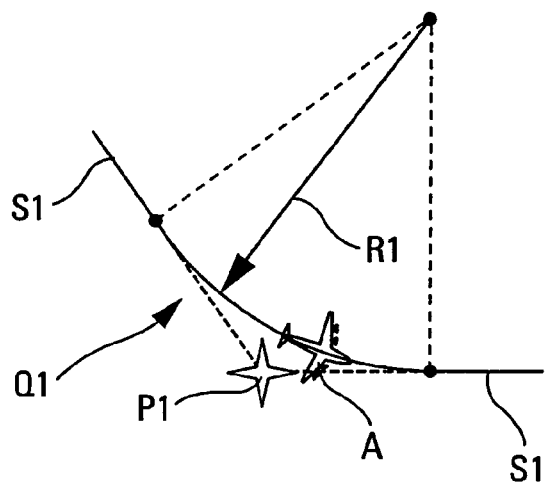
Figure 4:
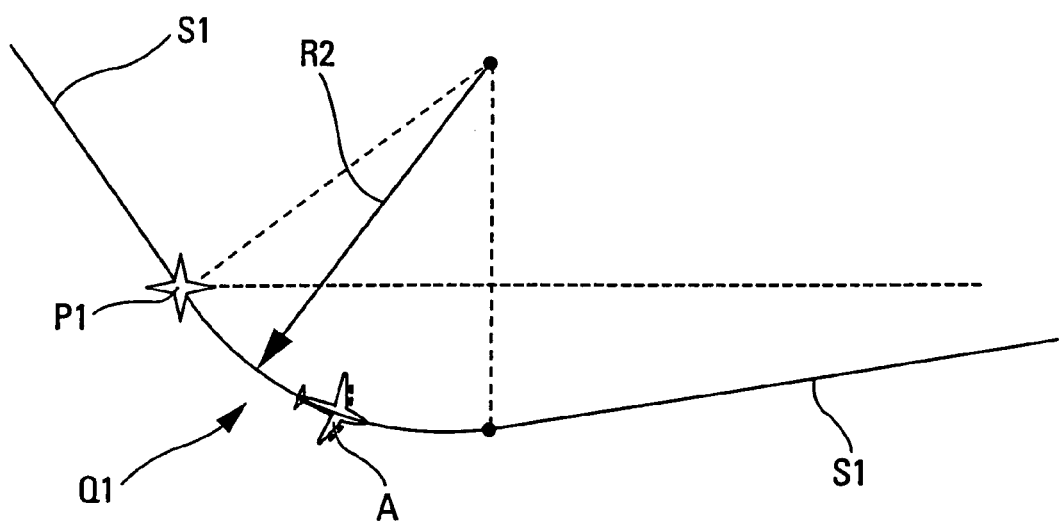

To construct a transition phase, there is provided a circular arc Q1 of constant radius of curvature R1, R2 (which depends on a maximum allowable load factor), as represented in FIG. 3, (associated with anticipation of turn) or as represented in FIG. 4 (associated with overfly obligation).

In a preferred embodiment, said vertical trajectory TV of the flight trajectory TO which is determined by the means 7 is formed, in a vertical plane, by a succession of segments S2 which are rectilinear and which exhibit a constant slope, as represented in FIG. 5.

The vertical trajectory TV can comprise, when climbing, consecutive climb sequences with variable slopes, so as to best follow the profile of the terrain 3, and conversely when descending. Each segment S2 of the vertical trajectory TV exhibits a predetermined minimum length dmin, corresponding preferably to a particular flight duration (for example 15 seconds of flight at the preset speed). This minimum length must make it possible to insert nose-down or nose-up transitions, as a function of the predicted maximum climb or descent performance of the aircraft A. However, so as not to penalize the following of the terrain 3, this minimum length condition may not be satisfied for a certain (limited) number of times, for example on passing the highest peak of the terrain 3. In this case, in order to follow the terrain 3 as closely as possible, account is taken of the following characteristics, to construct said vertical trajectory TV:

a climb at maximum angle of climb is favored with respect to a descent at maximum angle of descent, in the case where the terrain profile PT1 tends to rise between two height maxima, i.e. in a climb phase; and a descent at maximum angle of descent is favored with respect to a climb at maximum angle of climb, in the case where the terrain profile PT1 tends to drop between two height maxima, i.e. in a descent phase.

Furthermore, the slope $\gamma$ of each of said segments S2 is determined as a function of said terrain profile PT1 and of anticipated performance of the aircraft A and lies within a domain of slope values that is limited by a maximum angle of climb $\gamma1max$ and a maximum angle of descent $\gamma2max$, which can be attained by the aircraft A.

Moreover, said maximum angles of climb and descent $\gamma1max$ and $\gamma2max$ depend on flight conditions which are predicted over the corresponding segment S2.

Firstly, said maximum angle of climb $\gamma1max$ is determined from the following flight conditions, which are predicted over said segment S2:

the maximum continuous thrust of the aircraft A with one of its engines faulty;

the predicted wind;

the predicted exterior temperature;

the mass of the aircraft A. It is known that the mass varies. It is therefore possible, either to predict its variations (for example by taking account of the consumption of the fuel over the trajectory), or to consider it to be constant (then remaining conservative at the level of the climb and descent performance);

the maximum altitude of said segment S2;

the predicted aerodynamic configuration of the aircraft A over said segment S2; and the preset speed over said segment S2.

Secondly, said maximum angle $\gamma2max$ of descent is determined from the following flight conditions, which are predicted over said segment S2:

the idling thrust of the aircraft A with all its engines operational;

the predicted wind;

the predicted exterior temperature;

the mass of the aircraft A, obtained as indicated above;

the maximum altitude of said segment S2;

the predicted aerodynamic configuration of the aircraft A over said segment S2; and the preset speed over said segment S2.

The transition phases Q2 between two consecutive segments S2 in the vertical plane consist:

of a resource effected at constant positive load factor, if the difference in slope between said two segments S2 is positive; and of a dive performed at constant negative load factor, if the difference in slope between said two consecutive segments S2 is negative.

Represented in FIG. 5, in two magnified windows 20 and 21, are two transition phases Q2 at constant radius R3, R4 (illustrated by part of a circle C1, C2) of the vertical trajectory TV, corresponding respectively to a dive and to a resource.

Figure 6:
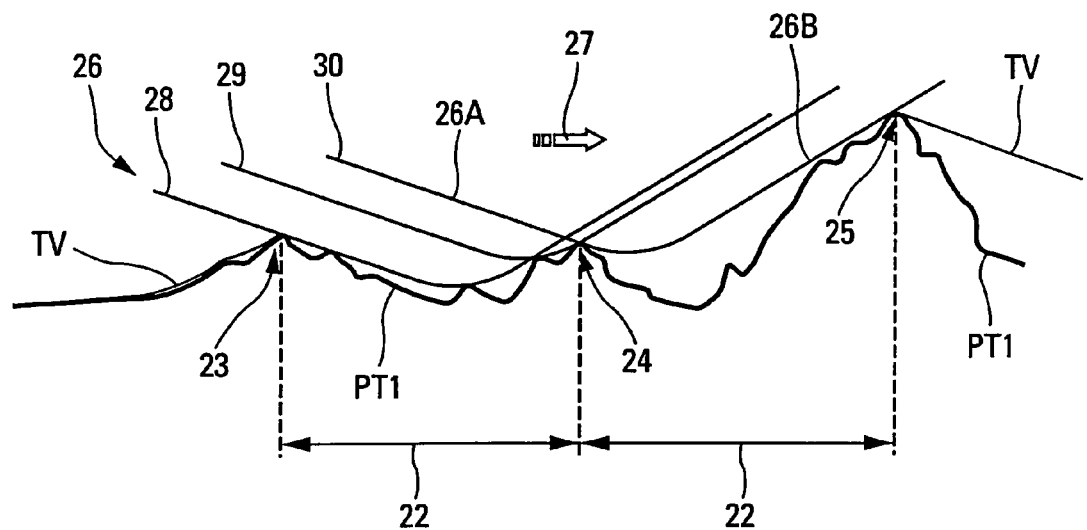

According to the invention, said means 7 forms said vertical trajectory TV, over a profile section 22 between two height maxima 23 and 24 or 24 and 25 of said terrain profile PT1:

by displacing over said terrain profile PT1, as represented by an arrow 27 in FIG. 6, a construction profile 26, three different positions 28, 29 and 30 of which have been shown in said FIG. 6. Said construction profile 26 exhibits a V shape, whose branches 26A and 26B are determined respectively by the maximum angles of climb and descent, as specified hereinbelow. Preferably, said branches 26A and 26B join up according to a circular arc transition phase; and by selecting a position of said construction profile 26, for which its edges arrive tangential (with circles C3 specified hereinbelow) with said terrain profile PT1, and no peak of said terrain profile PT1 crosses said construction profile 26. The position thus selected of said construction profile 26 makes it possible to form the part of said vertical trajectory TV which is situated at the level of said profile section 22. The construction profile 26 represents the tightest maneuver that the aircraft A can undertake, under the predicted conditions (mass, thrust, etc.), so as to climb up and pass a peak, while attempting to reach the lowest possible point in the trough of a valley. The vertical trajectory TV is therefore determined over the whole of the profile section 22 in such a way that the aircraft A is certain to pass the highest peak, while attempting to descend as low as possible.

When the construction profile 26 is displaced over the terrain profile PT1, it forms the vertical trajectory TV which is actually flyable vis-à-vis the performance of the aircraft A. This makes it possible to dispense with a large amount of digital terrain data (emanating from the means 2) which are never accessible to the aircraft A.

Figure 7:
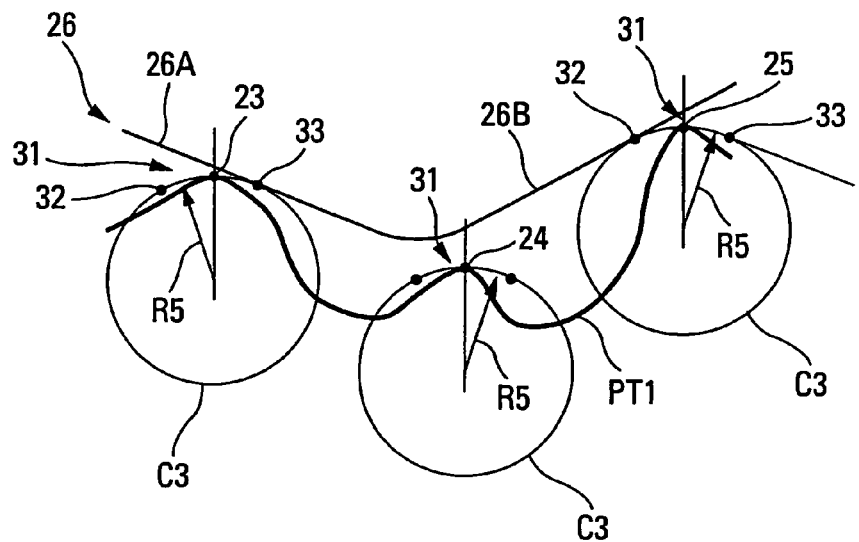

However, the terrain following is optimized, so as not to pass too high above the peaks. To do this, dive transitions are adapted over the height maxima 23, 24, 25. The construction profile 26 must then be tangential to the dive transition which is at constant radius. The circular arc 31 corresponding to this transition is delimited by points 32 and 33 which respectively represent the maximum climb slope and the maximum descent slope, as represented in FIG. 7. The vertical trajectory TV is computed from the highest point of the terrain profile PT1 (over the whole of the lateral trajectory section over which it is desired to compute a low altitude vertical trajectory), upstream and then downstream, by making the construction profile 26 displace along the terrain profile PT1, whose height maxima 23, 24 and 25 are topped by the circular arc transition 31 (part of the circle C3 of radius R5).

Figure 8:
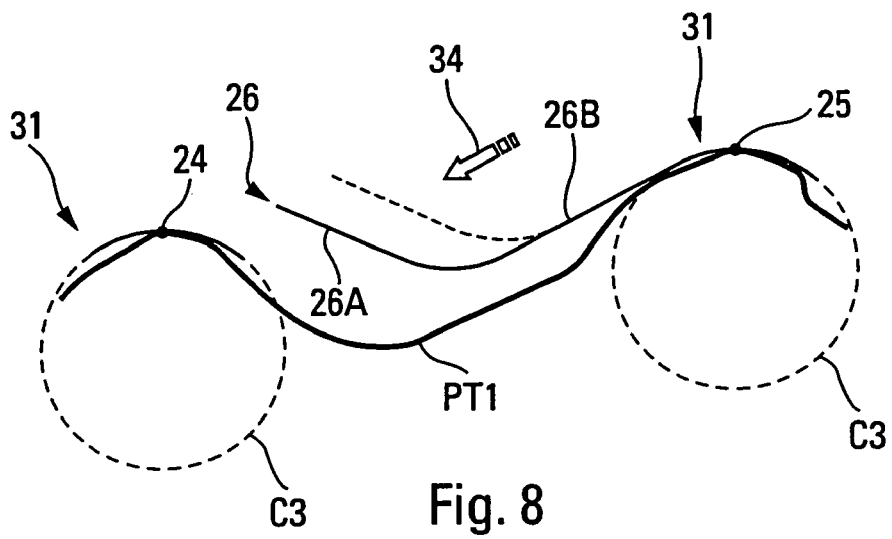
Figure 9:
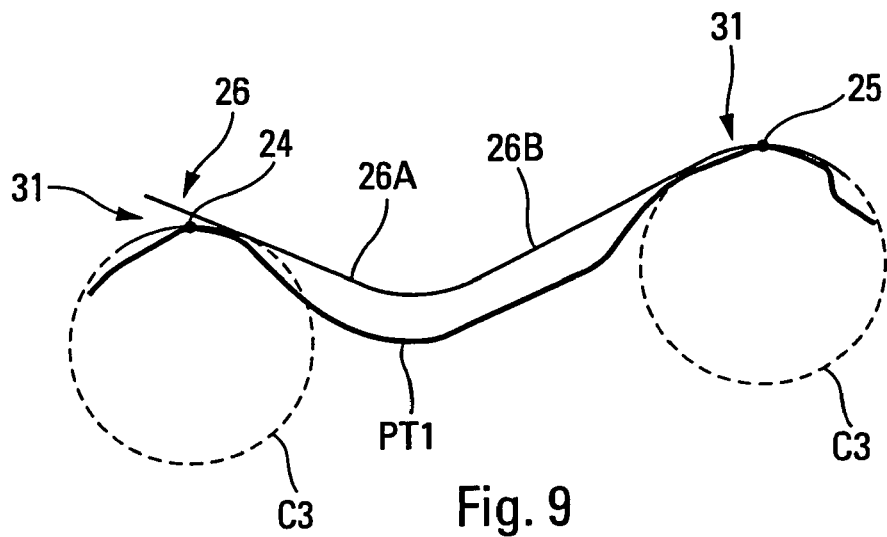
Figure 10:
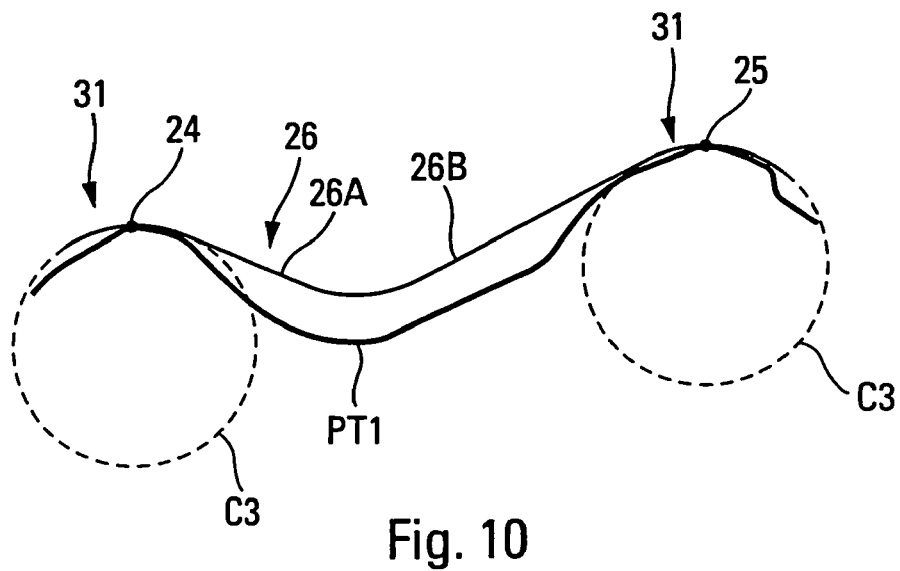

The first height maximum to be taken into account is the highest summit over the whole of the lateral computation trajectory. Specifically, the aircraft A must negotiate this peak. Next, the height maxima are extracted from the terrain profile PT1 from this highest summit, taking account of the minimum length dmin of the segments S2. By starting from a given height maximum, for example the highest peak 25 over the whole of the lateral trajectory, topped by the transition circular arc 31, the construction profile 26 is slid, as illustrated by an arrow 34 in FIG. 8, until it arrives in contact with a transition circular arc 31 corresponding to a height maximum 24, as represented in FIG. 9. It is then possible to form the vertical trajectory TV, as illustrated in the corresponding FIG. 10.

The nominal case of such a construction corresponds to the case where:
- the maximum gap between the branches 26A and 26B of the construction profile 26 can be inscribed within the valley trough between two successive height maxima 24 and 25, topped by the corresponding transition circular arcs 31; and
- the length dd of the descent segment (pertaining to branch 26A) and the length dm of the climb segment (pertaining to branch 26B), measured horizontally, are greater than or equal to a minimum distance corresponding to the aforesaid minimum length dmin of said segments S2.

Figure 11:
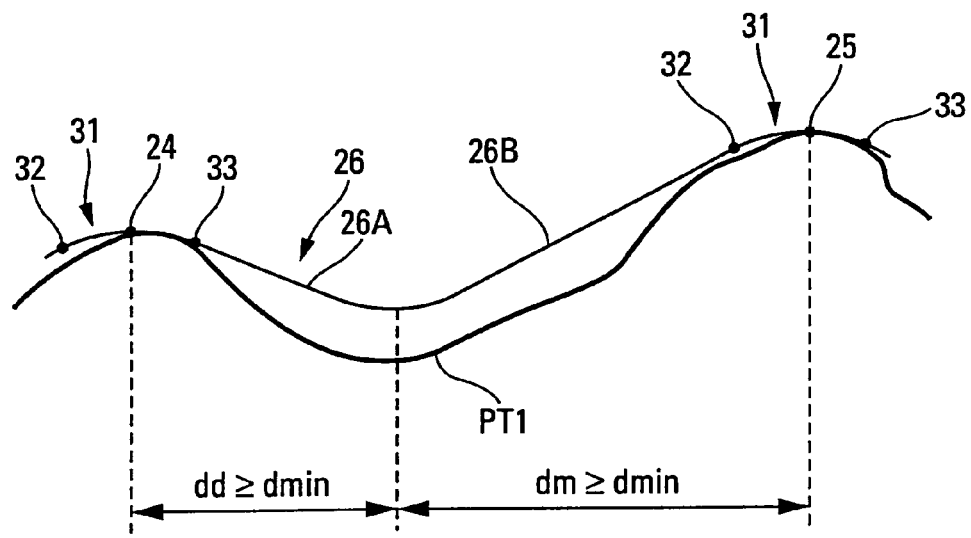
Figure 12:
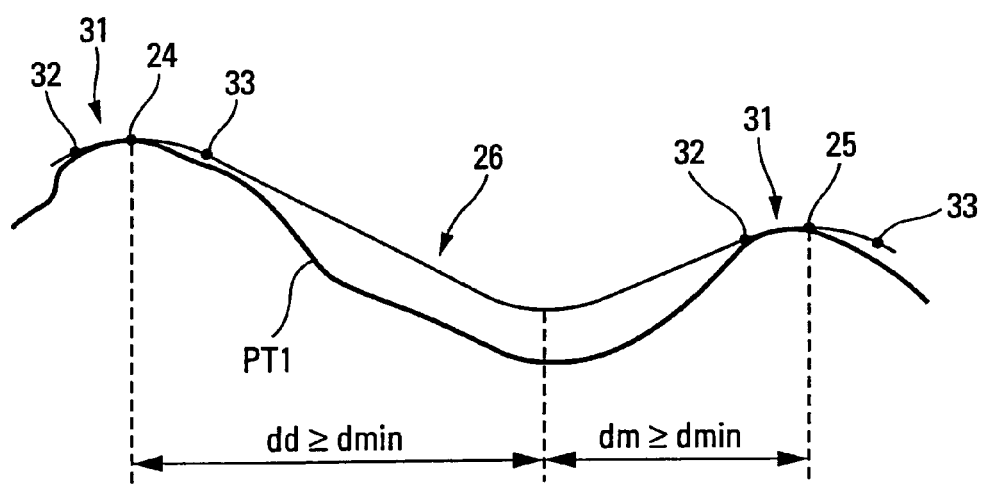

This nominal case is represented:
- for a climb, in FIG. 11; and
- for a descent, in FIG. 12.

Figure 13:
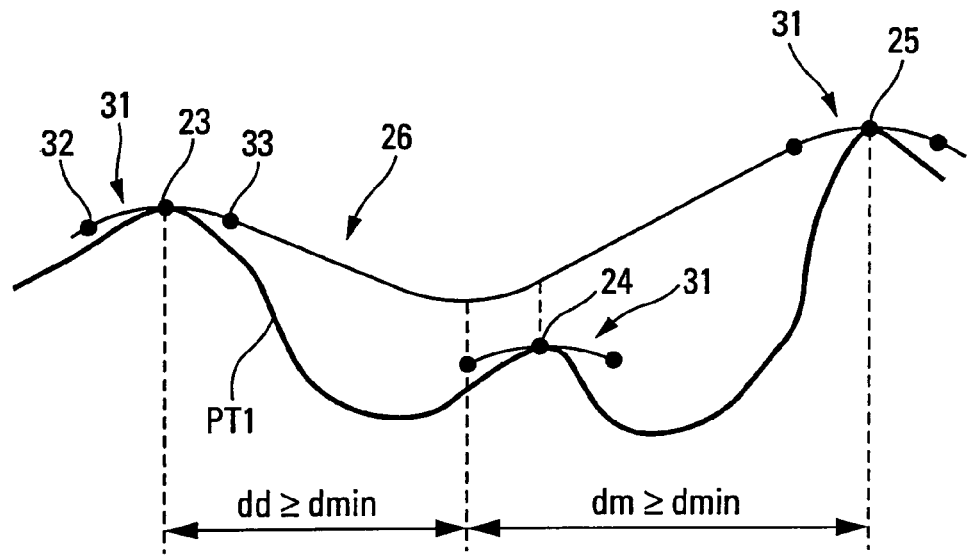
Figure 14:
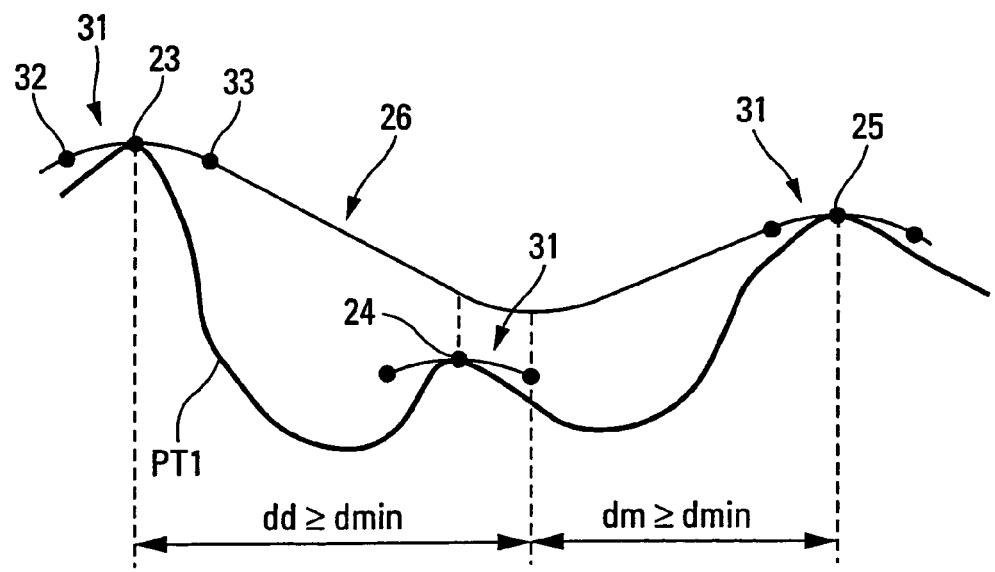

Additionally, in the case where the construction profile 26 cannot attain the previous or next height maximum 24, we find ourselves once again in the aforesaid case by considering the first height maximum (upstream in the case of a climb, and downstream in the case of a descent), in which the construction profile 26 can be inscribed (that is to say between two height maxima 23 and 25 that are not directly consecutive). The intermediate height maximum 24 is therefore not attained each time, neither when climbing (FIG. 13), nor when descending (FIG. 14).

Figure 15:
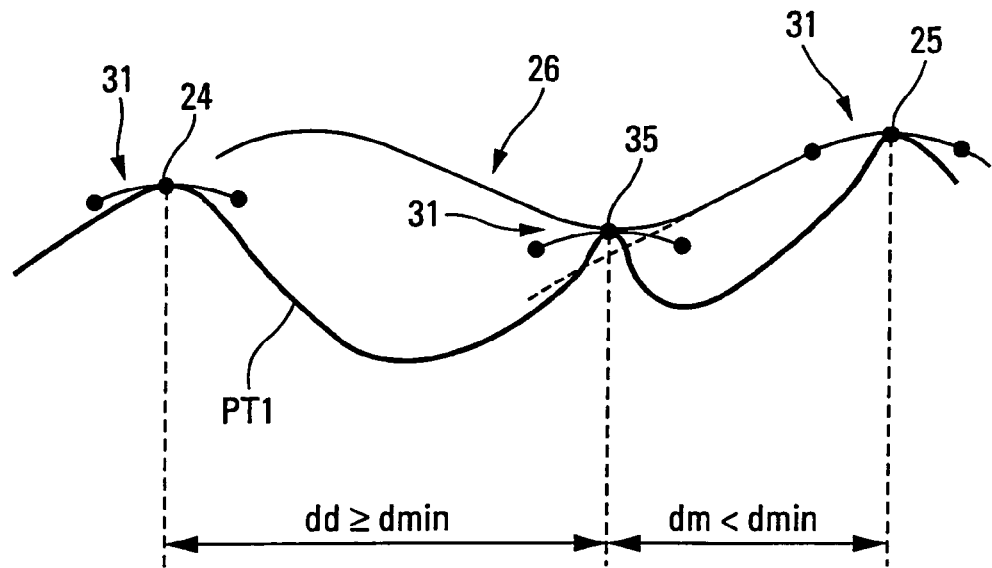

Additionally, in the case where the construction profile 26 cannot be inscribed between two height maxima 24 and 25, because:
- it intercepts and an intermediate relief 35; and
- the minimum distance constraints dmin are not complied with, the depth of said construction profile 26 is decreased (FIG. 15).

Figure 16:
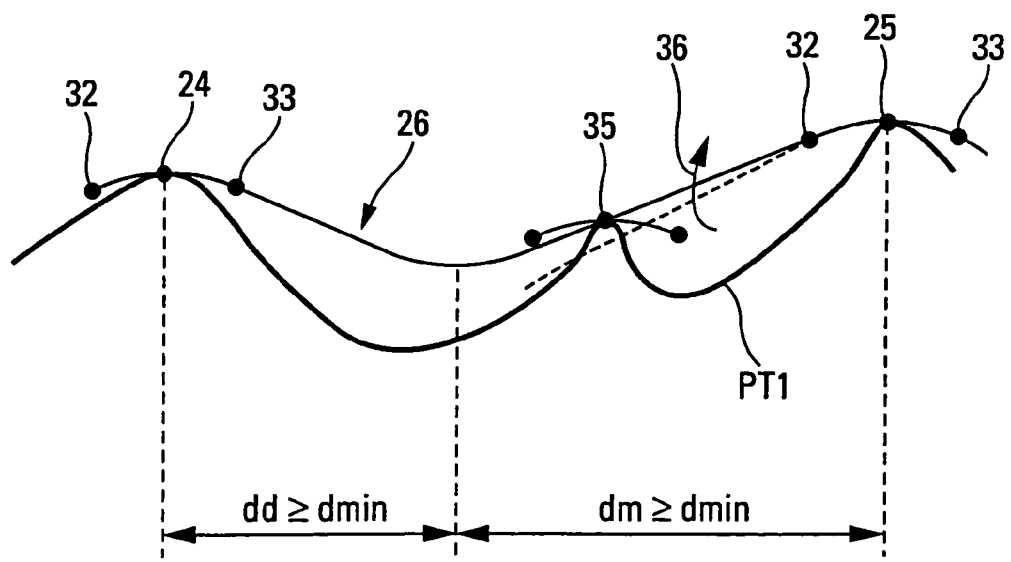
Figure 17:
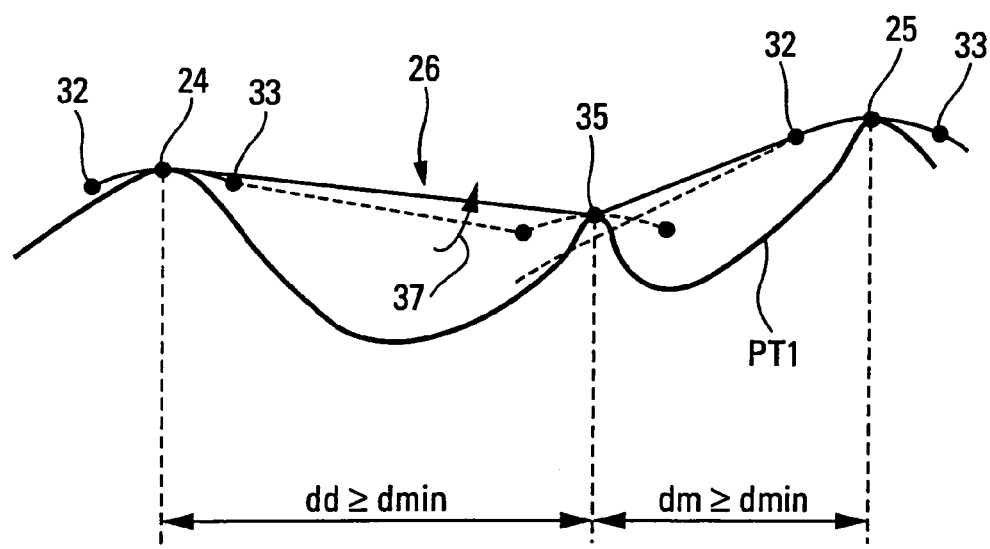

More precisely:
- the climb slope is relaxed, as illustrated by an arrow 36 in FIG. 16, so as to pass the intermediate obstacle 35, when the minimum distance constraints (dd≧dmin and dm≧dmin) over the new segments are complied with;
- in the case where the initial climb segment complies with the distance constraint (dm≧dmin), the climb slope is relaxed, as illustrated by an arrow 37 in FIG. 17; and
- in the other cases, the vertical trajectory TV is constructed over the profile section 22 considered, so that the aircraft A descends as low as possible into the troughs of the relief 4 of the terrain 3.

Figure 18:
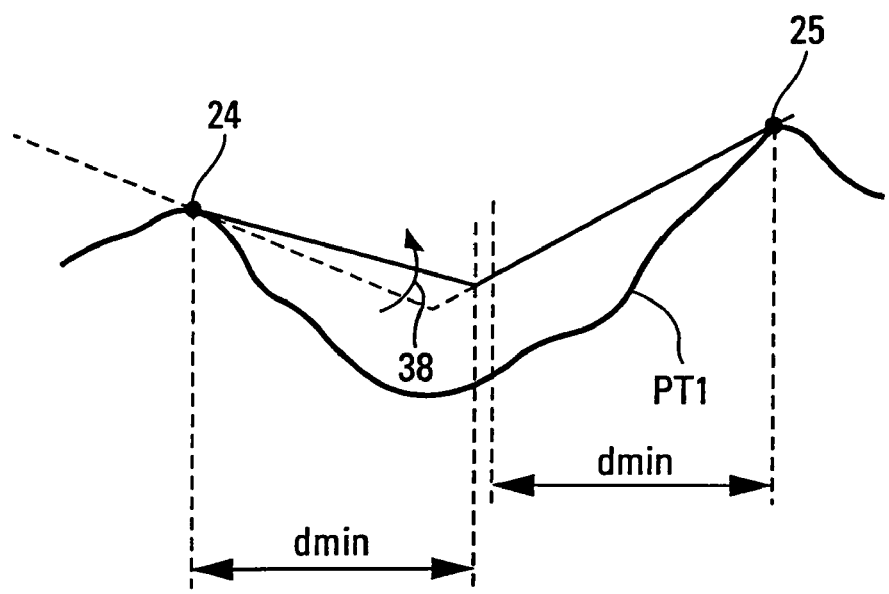
Figure 19:
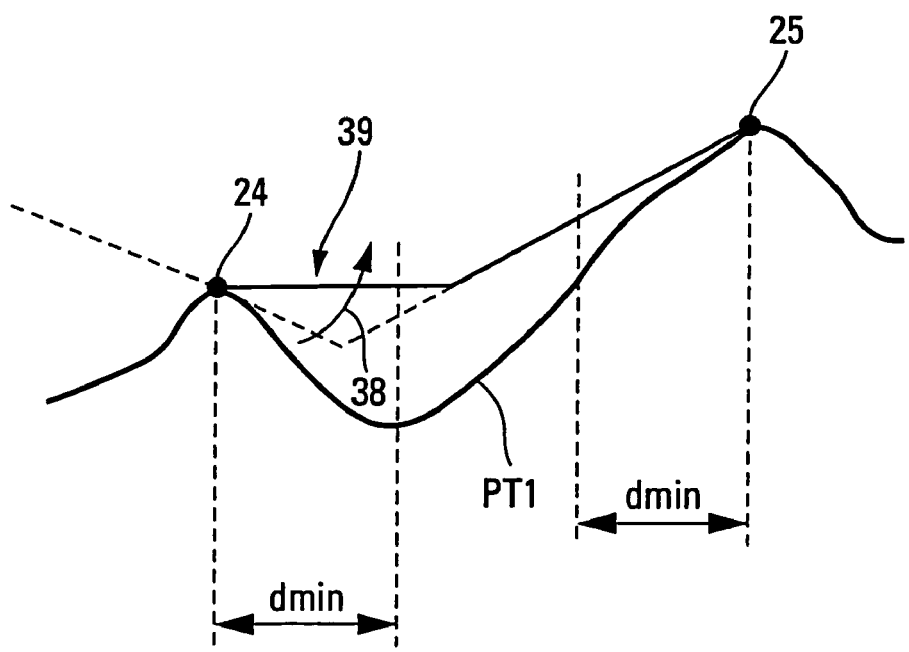

Additionally, in the case of a climb phase (FIGS. 18 to 22), a climb at maximum slope is favored. When the distance constraints are complied with, the construction profile 26 is altered by decreasing the slope of the descent segment, as illustrated by an arrow 38 in FIG. 18, limiting oneself as appropriate to a zero descent slope, while preserving the maximum climb slope. The descent slope adopted must be such that the distance dm is equal to the minimum distance dmin and that the distance dd remains greater than or equal to said minimum distance dmin (FIG. 18). Moreover, the decrease in the descent slope may be such that the climb is preceded by a plateau 39, as represented in FIG. 19, when the minimum distance constraints are complied with.

Figure 20:
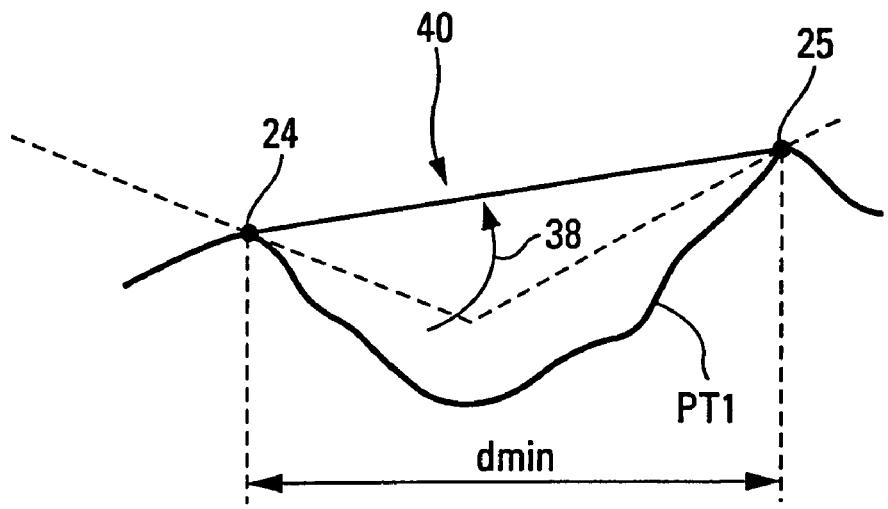

Furthermore, if by decreasing the descent slope, the distance dm becomes equal to the distance dmin, without the distance dd attaining the distance dmin, then the vertical trajectory TV is defined at constant slope between the height maxima 24 and 25, as represented by a single segment 40 in FIG. 20.

Figure 22:
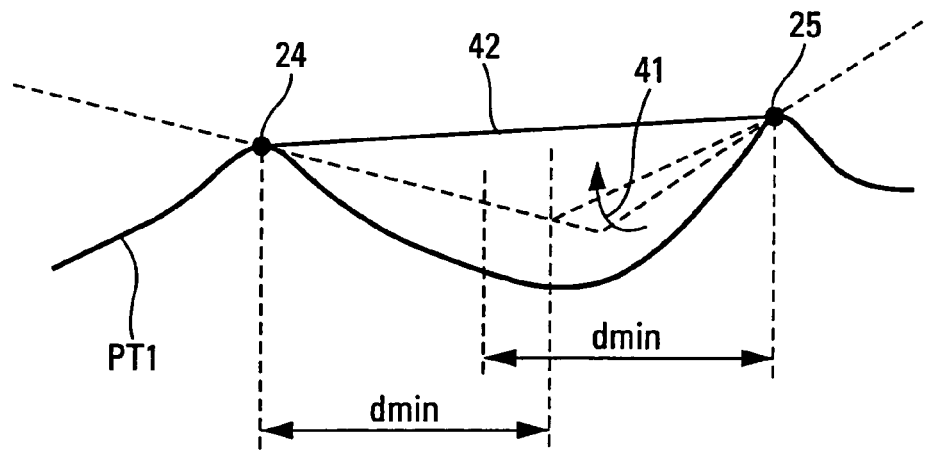
Figure 21:
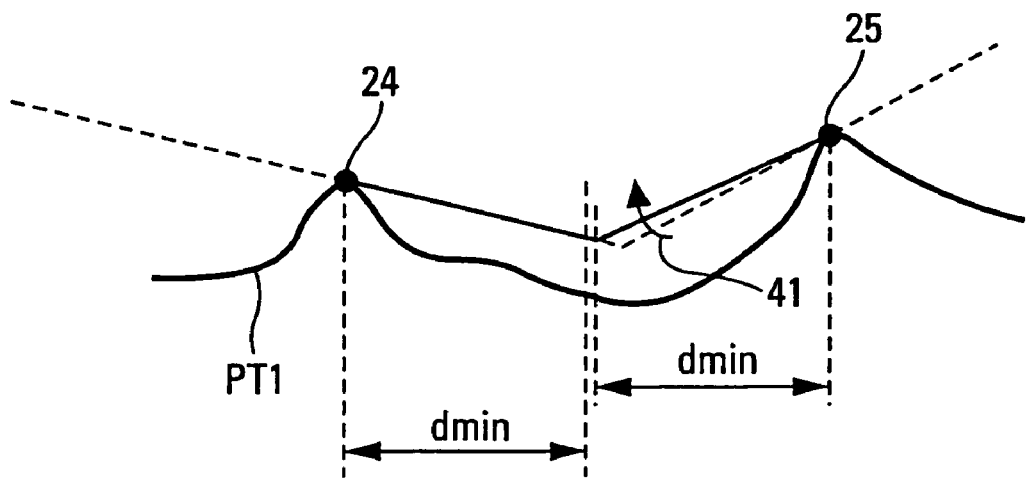

In the case where:
- dd is greater than or equal to dmin; and
- dm is less than dmin, the alteration is performed by decreasing the slope of the climb segment, as represented by an arrow 41 in FIG. 21, while preserving the maximum descent slope, the climb slope adopted must be such that the distances dd and dm are greater than or equal to the distance dmin. If, by decreasing the climb slope, the distance dd becomes equal to the distance dmin, without the distance dm attaining the distance dmin, the vertical trajectory TV is defined at constant slope between the height maxima 24 and 25 along a single segment 42 (FIG. 22).

Additionally, in the case of a descent phase (FIGS. 23 to 26), that is to say when a height maximum 24 is higher than the height maximum 25 which follows it, a descent at maximum slope is favored.

Figure 23:
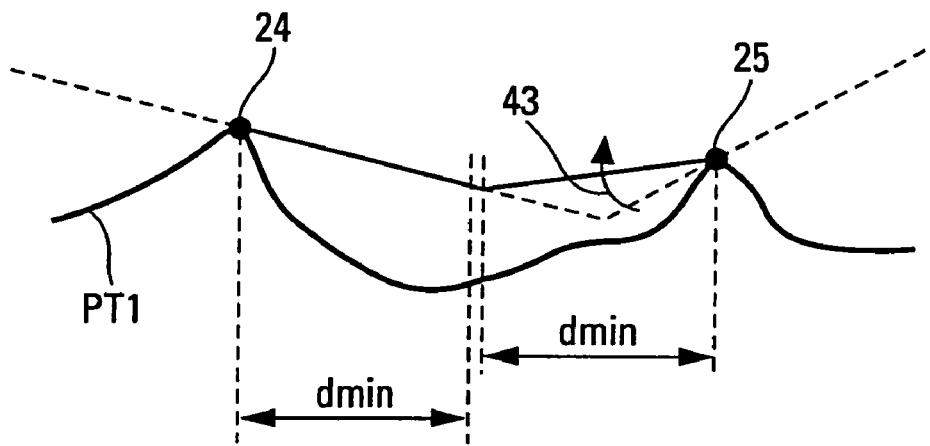

In the case where the construction profile 26 is inscribed in such a way that the distance dd is greater than or equal to the distance dmin, but that the distance dm is less than the distance dmin, the alteration is performed by decreasing the slope of the climb segment, as illustrated by an arrow 43 in FIG. 23, limiting oneself to a zero climb slope, while preserving the maximum descent slope. In this case, the climb slope adopted must be such that the distances dm and dd are greater than or equal to the distance dmin.

Figure 24:
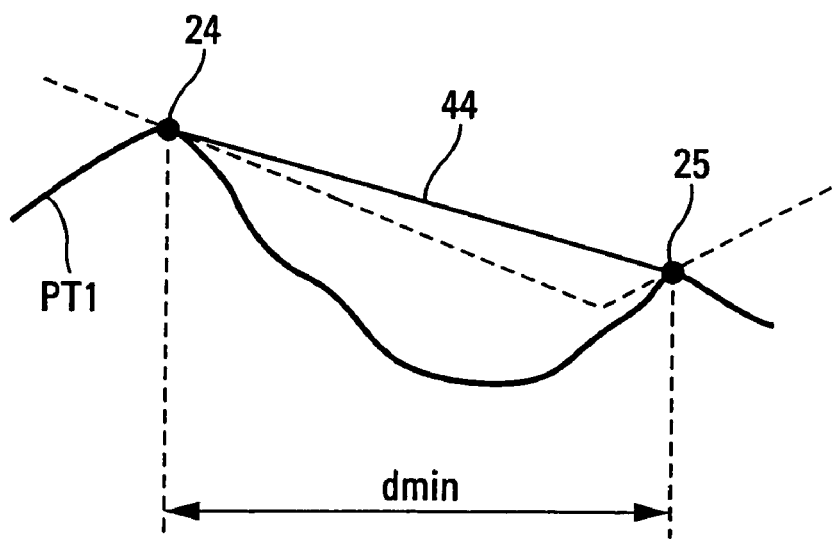
Figure 25:
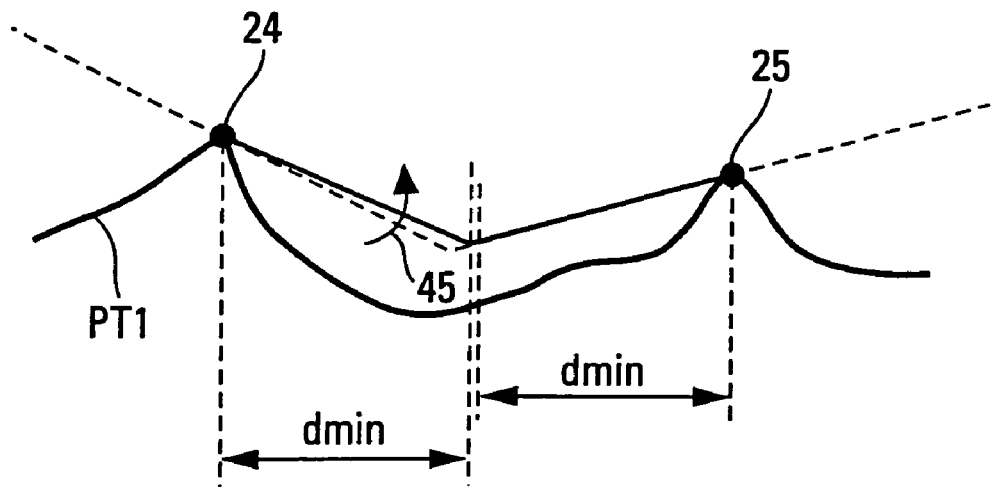

The decrease in the climb slope may be such that the descent is followed by a plateau if the two segments are of sufficient length. If, by decreasing the climb slope, the distance dd becomes equal to the distance dmin, without the distance dm attaining the distance dmin, then the vertical trajectory TV is performed at constant slope between the height maxima 24 and 25 along a single segment 44, as represented in FIG. 24.

Additionally, in the case where the distance dm is greater than or equal to the distance dmin, then the distance dd remains less than the distance dmin, the alteration is performed by decreasing the descent slope (arrow 45 in FIG. 25), while preserving the maximum climb slope. The descent slope adopted must be such that the distances dm and dd are greater than or equal to the distance dmin, as represented in this FIG. 28.

Figure 26:
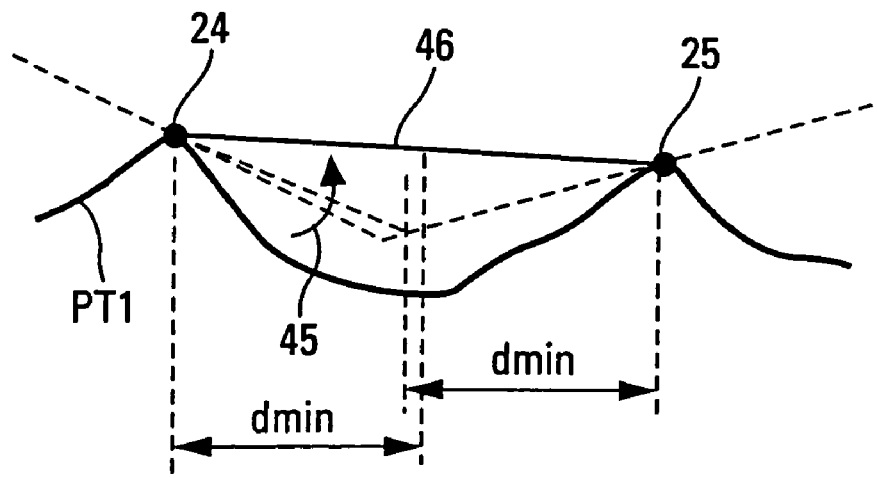

If, by decreasing the descent slope, the distance dm becomes equal to the distance dmin, without the distance dd attaining the distance dmin, then the vertical trajectory TV is defined at constant slope between the height maxima 24 and 25 along a single segment 46, as represented in FIG. 26.

Additionally, in the case where the distances dd and dm are less than the distance dmin and the distance between the two height maxima considered 24 and 25 is greater than the distance dmin, the descent is performed between these two height maxima 24 and 25 directly without intermediate resource.

The invention claimed is:

1. A method performed by a computer to construct a low altitude flight trajectory to be followed by an aircraft, in particular a military transport plane, said flight trajectory comprising a lateral trajectory and a vertical trajectory, the method comprising:
- providing a terrain profile pertaining to a terrain to be overflown by the aircraft together with information pertaining to the aircraft and to its environment;
- constructing said lateral trajectory of the flight trajectory; and
- constructing said vertical trajectory of the flight trajectory over a profile section defined between two height maxima of said terrain profile by:

displacing over said entire terrain profile a V-shaped construction profile, having two branches determined respectively by maximum angles of climb and of descent; and selecting a position of said construction profile, at which edges of said construction profile are tangential to said terrain profile, and no peak of said terrain profile crosses said construction profile, so that the position thus selected of the construction profile allows the construction profile to form the part of the vertical trajectory which is situated at the level of said profile section, wherein the two branches of the V-shaped construction profile join up according to a circular arc transition phase, and the method further comprises:

setting a highest summit over the entire lateral computation trajectory as a first height maximum of the two height maxima;

extracting the height maxima from the terrain profile from the highest summit, taking account of a minimum length of segments of the construction profile;

topping the height maxima by circular arc transitions;

sliding the construction profile by starting from a given height maximum topped by a transition circular arc, until the construction profile arrives in contact with a transition circular arc corresponding to a height maximum; and sliding the edges of the construction profile to be tangential with these circular arc transitions.

2. The method as claimed in claim 1, wherein the two height maxima of the terrain profile, that enable defining of a profile section to be taken into account, are separated horizontally by at least a distance corresponding to a minimum length pertaining to a segment of the vertical trajectory.

3. The method as claimed in claim 1, wherein, in the case where the construction profile cannot be inscribed between said two height maxima, an angle between the two branches of said construction profile is increased to enable the inscription.

4. The method as claimed in claim 1, wherein said lateral trajectory of the flight trajectory is formed, in a horizontal plane, by a succession of branches which are rectilinear and which are separated from one another by first transition phases.

5. The method as claimed in claim 4, wherein at least one of said first transition phases, between two successive branches, corresponds to a circular arc of constant radius of curvature.

6. The method as claimed in claim 4, wherein two successive branches cross at a turning point, wherein said turning point is associated with an overfly condition pertaining to an obligation of the aircraft to overfly or not to overfly the turning point, and wherein the corresponding first transition phase takes account of the overfly condition.

7. The method as claimed in claim 1, wherein said vertical trajectory of the flight trajectory is formed, in a vertical plane, by a succession of segments which are rectilinear and which exhibit a constant slope.

8. The method as claimed in claim 7, wherein a slope of each of said segments is determined as a function of said terrain profile and of performance of the aircraft and lies within a domain of slope values that is limited by a maximum angle of climb and a maximum angle of descent.

9. The method as claimed in claim 8, wherein said maximum angles of climb and descent depend on flight conditions which are predicated over the corresponding segment.

10. The method as claimed in claim 9, wherein said maximum angle of climb is determined from a first set of flight conditions which are predicted over said segment, the first set of flight conditions comprising:
    a maximum continuous thrust of the aircraft with a faulty engine;
    a predicted wind;
    a predicted exterior temperature;
    a mass of the aircraft;
    a maximum altitude of said segment;
    a predicted aerodynamic configuration of the aircraft; and
    a preset speed over said segment.

11. The method as claimed in claim 9, wherein said maximum angle of descent is determined from a second set of flight conditions; which are predicted over said segment, the second set of flight conditions comprising:
    an idling thrust of the aircraft with all its engines operational;
    a predicted wind;
    a predicted exterior temperature;
    a mass of the aircraft;
    a maximum altitude of said segment;
    a predicted aerodynamic configuration of the aircraft; and
    a preset speed over said segment.

12. The method as claimed in claim 7, wherein each segment exhibits a predetermined minimum length.

13. The method as claimed in claim 12, wherein, to enable following of the terrain profile as closely as possible, account is taken of the following characteristics in constructing said vertical trajectory:
    a climb at maximum angle of climb is favored with respect to a descent at maximum angle of descent, in the case where the terrain profile tends to rise between two height maxima; and
    a descent at maximum angle of descent is favored with respect to a climb at maximum angle of climb, in the case where the terrain profile tends to drop between two height maxima.

14. The method of claim 1, wherein the constructing of the vertical trajectory further comprises:
    topping said height maxima by circular arc transitions; and
    sliding said construction profile from a highest of said height maxima in said lateral trajectory until said construction profile contacts one of said circular arc transitions corresponding to another of said height maximum having a height which is less than said highest height maxima.

15. A method performed by a computer to construct a low altitude flight trajectory to be followed by an aircraft, in particular a military transport plane, said flight trajectory comprising a lateral trajectory and a vertical trajectory, the method comprising:
    providing a terrain profile pertaining to a terrain to be overflown by the aircraft together with information pertaining to the aircraft and to its environment;
    constructing said lateral trajectory of the flight trajectory; and
    constructing said vertical trajectory of the flight trajectory over a profile section defined between two height maxima of said terrain profile by:
    displacing over said entire terrain profile a V-shaped construction profile, having two branches determined respectively by maximum angles of climb and of descent; and
    selecting a position of said construction profile, at which edges of said construction profile are tangential to said terrain profile, and no peak of said terrain profile crosses said construction profile, so that the position thus selected of the construction profile allows the construction profile to form the part of the vertical trajectory which is situated at the level of said profile section, wherein the two branches of the V-shaped construction profile join up according to a circular arc transition phase, and the method further comprises:

setting a highest summit over the entire lateral computation trajectory as a first height maximum of the two height maxima;

extracting the height maxima from the terrain profile from the highest summit, taking account of a minimum length of segments of the construction profile;

topping the height maxima by circular arc transitions;

sliding the construction profile by starting from a given height maximum topped by a transition circular arc, until the construction profile arrives in contact with a transition circular arc corresponding to a height maximum; and sliding the edges of the construction profile to be tangential with these circular arc transitions, wherein:

in a climb phase, the method further comprises maximizing a climb slope and decreasing a descent slope to a zero descent slope, and in a descent phase, the method further comprises maximizing a descent slope and decreasing a climb slope to a zero climb slope.

\* \* \* \* \*